United States Patent
Cannon et al.

(10) Patent No.: US 7,248,280 B2
(45) Date of Patent: Jul. 24, 2007

(54) LASER SCANNER HAVING REDUCED AIR CURRENTS

(75) Inventors: Roger Steven Cannon, Nicholasville, KY (US); Martin Christopher Klement, Lexington, KY (US); Philip Edwin Riggs, Lexington, KY (US); Eric Wayne Westerfield, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 372 days.

(21) Appl. No.: 10/869,408

(22) Filed: Jun. 16, 2004

(65) Prior Publication Data

US 2005/0280699 A1    Dec. 22, 2005

(51) Int. Cl.
*B41J 2/435*    (2006.01)
*B41J 2/00*    (2006.01)

(52) U.S. Cl. ........................ 347/263; 347/257
(58) Field of Classification Search ............... None
See application file for complete search history.

(56) References Cited

U.S. PATENT DOCUMENTS

| | | | |
|---|---|---|---|
| 4,100,405 A * | 7/1978 | Kondrollochis | 250/202 |
| 5,309,255 A | 5/1994 | Brandt et al. | |
| 5,353,048 A * | 10/1994 | Kanai | 347/246 |
| 5,629,790 A * | 5/1997 | Neukermans et al. | 359/198 |
| 5,771,055 A | 6/1998 | Aiba et al. | |
| 5,867,297 A | 2/1999 | Kiang et al. | |
| 5,892,219 A * | 4/1999 | Minakuchi et al. | 250/205 |
| 5,900,961 A * | 5/1999 | Miyamoto et al. | 359/196 |
| 5,953,042 A * | 9/1999 | Nabeta et al. | 347/263 |
| 6,449,107 B2 * | 9/2002 | Tachibe et al. | 359/819 |
| 6,612,493 B1 | 9/2003 | DeGiovine et al. | |
| 2002/0141023 A1 | 10/2002 | Yamada et al. | |
| 2003/0030810 A1 * | 2/2003 | Sebok et al. | 356/436 |
| 2003/0067530 A1 * | 4/2003 | Ishikawa et al. | 347/235 |
| 2003/0184836 A1 | 10/2003 | Kaneko et al. | |

* cited by examiner

*Primary Examiner*—Lamson Nguyen
*Assistant Examiner*—Sarah Al-Hashimi
(74) *Attorney, Agent, or Firm*—Luedeka, Neely & Graham

(57) ABSTRACT

A method for improving the operation of an electrophotographic printer. The method includes providing an electrophotographic printer containing a laser scanning unit. A torsion oscillator for the laser scanning unit is enclosed in closed compartment. The closed compartment includes side walls having first and second side wall edges, a bottom wall attached on the first side wall edges, and a cover attached adjacent to the second side wall edges. The closed compartment is sufficient to reduce stray air currents from adjacent the torsion oscillator thereby improving the operation of the electrophotographic printer.

13 Claims, 6 Drawing Sheets

LASER SCANNER HAVING REDUCED AIR CURRENTS

FIELD OF THE INVENTION

Laser scanners have rotating mirrors or oscillating mirrors that can be adversely affected by stray air currents. Methods and apparatus for reduction of stray air currents for an oscillating mirror scanner are provided by a system as described herein.

BACKGROUND OF THE INVENTION

Laser scanners containing torsion oscillators are known, although not widely used in scanning systems. U.S. Pat. Nos. 4,762,994 to Byerly et al., 5,543,956 to Nakagawa et al. and 5,767,666 to Asada et al. are illustrative examples of such laser scanners. An illustration of a galvanometric torsion oscillator is shown in the '994 patent. (The term galvanometric is believed to be a reference to coils on the turning member operated in the manner of a common galvanometer.)

The torsion oscillator functions as a laser scanner when a laser beam is directed at an oscillating mirror surface of the device. Such a device replaces the much bulkier rotating polygonal mirror widely used in laser printers and copiers. Torsion oscillators also have other applications, such as to drive a clocking device, in which a mirror would not be used.

Because the oscillations of the plate are relatively rapid during a scanning process, variations or distortion of the motion of oscillating plate can occur due to the influence of external air currents. Such disturbances from external air currents result in jitter of the laser beam image scanned across the photoconductor in a laser printer. Dust accumulation on an oscillating plate or rotating mirror scanning device may also cause variations or distortions in the motion of the mirror and deterioration of intensity of the laser beam image scanned across the photoconductor in a laser printer.

Accordingly, there is a need for improved oscillating plate systems that are not adversely affected by stray air currents.

SUMMARY

With regard to the above and other objects and advantages, there is provided an improvement in an electrophotographic printer containing a torsion oscillator type laser scanning device which oscillates during use. The improvement includes an enclosed housing containing a torsion oscillator and a mirror. The enclosed housing has side walls, a bottom wall adjacent first ends of the side walls, and a cover adjacent to opposing second ends of the side walls, each positioned relative to one another so as to yield the enclosed housing. The housing is enclosed to sufficiently prevent air currents from affecting oscillations of the torsion oscillator during an electrophotographic scanning process.

In another embodiment, there is provided a method for improving the operation of an electrophotographic printer. The method includes providing an electrophotographic printer containing a laser scanning unit. A torsion oscillator for the laser scanning unit is enclosed in a closed compartment. The closed compartment includes side walls having first and second side wall edges, a bottom wall attached adjacent to the first side wall edges, and a cover attached adjacent to the second side wall edges. The closed compartment is sufficient to reduce stray air currents from adjacent the torsion oscillator thereby improving the operation of the electrophotographic printer.

Yet another embodiment provides a subunit for an electrophotographic printer. The subunit includes a closed compartment including a torsion oscillator device attached to a bottom wall between sidewalls having first and second side wall edges. A cover is attached adjacent to the second side wall edges. The torsion oscillator device in the closed compartment is effectively isolated from stray air currents that can affect the operation of the electrophotographic printer.

The foregoing embodiments provide a convenient subunit assembly for a laser scanning unit of an electrophotographic printer that reduces stray air currents adjacent an oscillating mirror device used for scanning. The device also reduces acoustic noise generated by the oscillating mirror device. A minimum number of components are included in an enclosed structure by providing side walls containing one or more lenses. A laser beam source for the laser scanning unit is disposed outside of the enclosed structure thereby simplifying the construction of the subunit assembly.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE PREFERRED EMBODIMENTS

Figure 1:
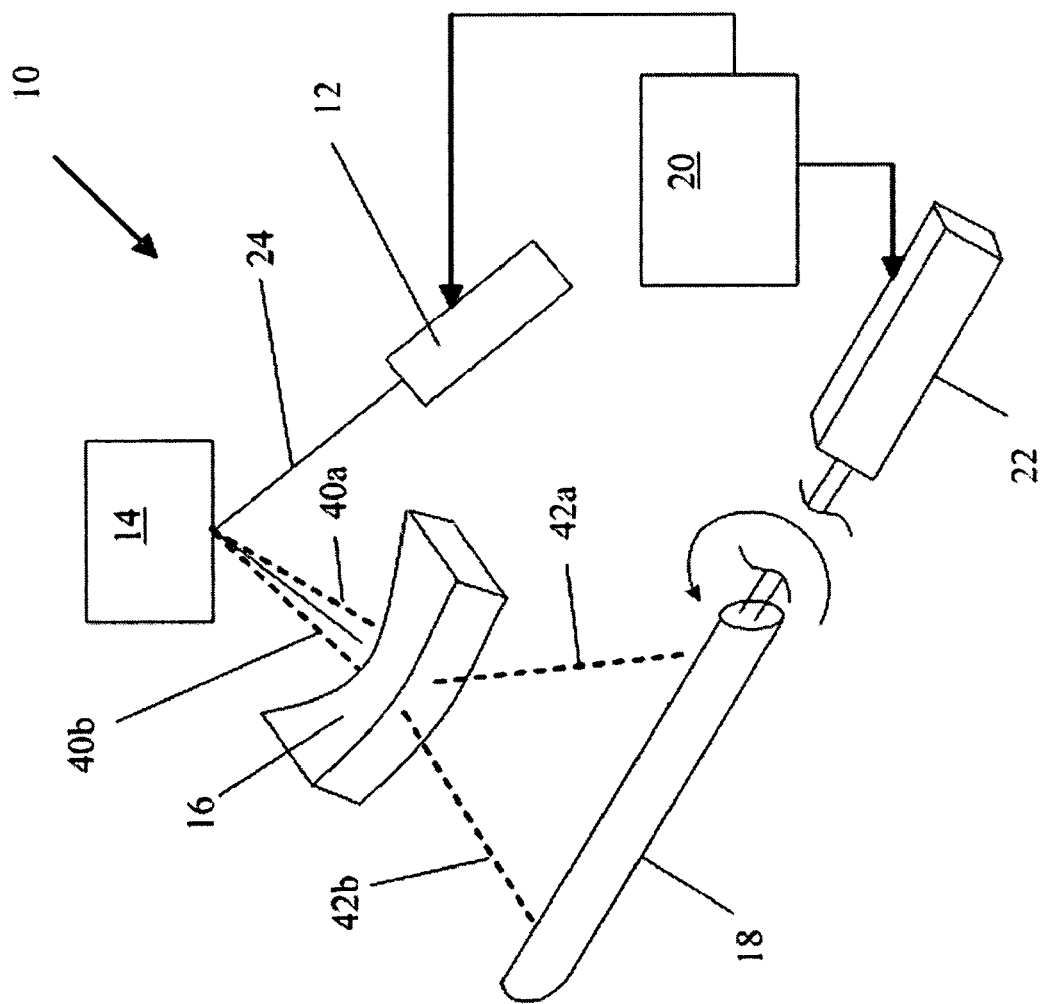
FIG. 1 is a schematic block diagram of an electrophotographic printer.

In one embodiment, there is provided an improvement for an electrophotographic printer using a torsion oscillator for scanning a rotating drum. A schematic drawing of an electrophotographic printer 10 incorporating the improvement is provided in FIG. 1. The printer 10 includes a laser beam source 12, a scanning device 14, a lens system 16, and a rotating photosensitive drum 18. A control unit 20 controls a motor 22 for the rotating drum and the laser beam source 12. Scan lines of data are provided across a longitudinal length of the drum 18 by reflection of a laser beam 24 by a torsion oscillator scanning device 26 having a mirrored surface as described in more detail below with respect to FIGS. 2 and 3.

Figure 3:
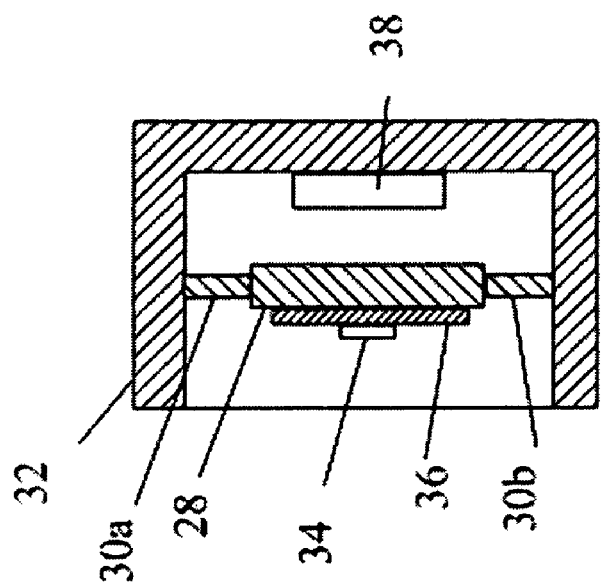
FIG. 3 is a schematic cross-sectional view, not to scale, of an oscillating mirror device for an electrophotographic printer.
Figure 2:
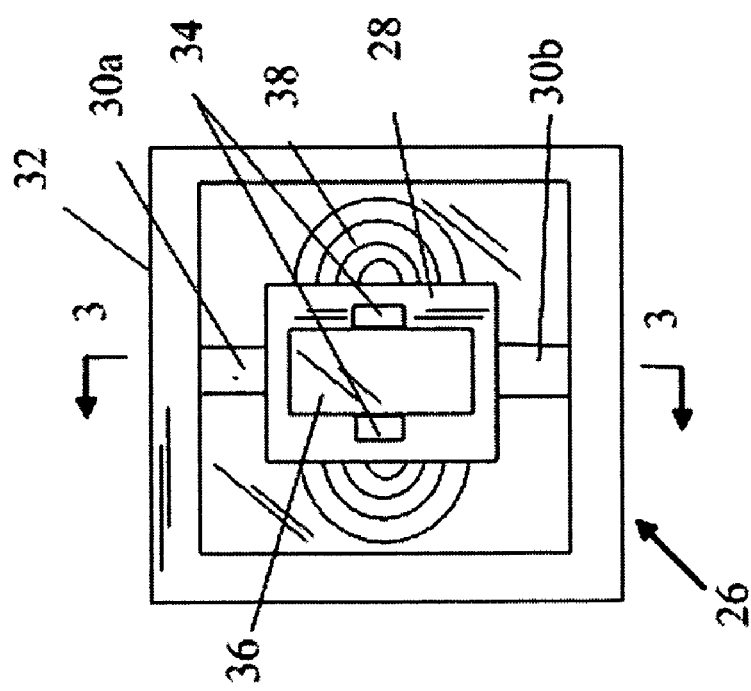
FIG. 2 is a schematic plan view, not to scale, of an oscillating mirror device for an electrophotographic printer.

With reference now to FIGS. 2 and 3, the torsion oscillator scanning device 26 is illustrated. The torsion oscillator scanning device 26 includes a central plate 28 suspended by two extensions 30a and 30b of the material of plate 28. Extensions 30a, 30b are integral with a surrounding frame 32. Typically, the plate 28, extensions 30a, 30b and frame 32 are cut or etched from a single silicon wafer. Permanent magnetic material 34 and a mirror 36 or similar reflective surface are placed on the central plate 28. The mirror 36 may be a smooth or polished surface of the central plate 28, since silicon itself is about sixty percent reflective.

The entire assembly of plate 28, extensions 30a and 30b, mirror 36, and magnetic material 34 are located inside a magnetic field provided by wire coils 38. When an alternating electrical drive signal current, such as a square wave or sine wave, is applied to the coils 38, an alternating electromagnetic field is produced. The alternating electromagnetic field applies and attracting or repelling force to the magnetic material 34 attached to the plate 28. This force causes rotation of plate 28 around extensions 30a and 30b that twist with reverse inherent torsion providing an oscillating mirror 36 for reflecting the laser beam 24 as shown in FIG. 1 to provide oscillating beams 40a and 40b. The oscillating beams 40a and 40b are transmitted through the lens system 16 to provide scanning beams 42a and 42b for scanning the drum 18.

Figure 4:
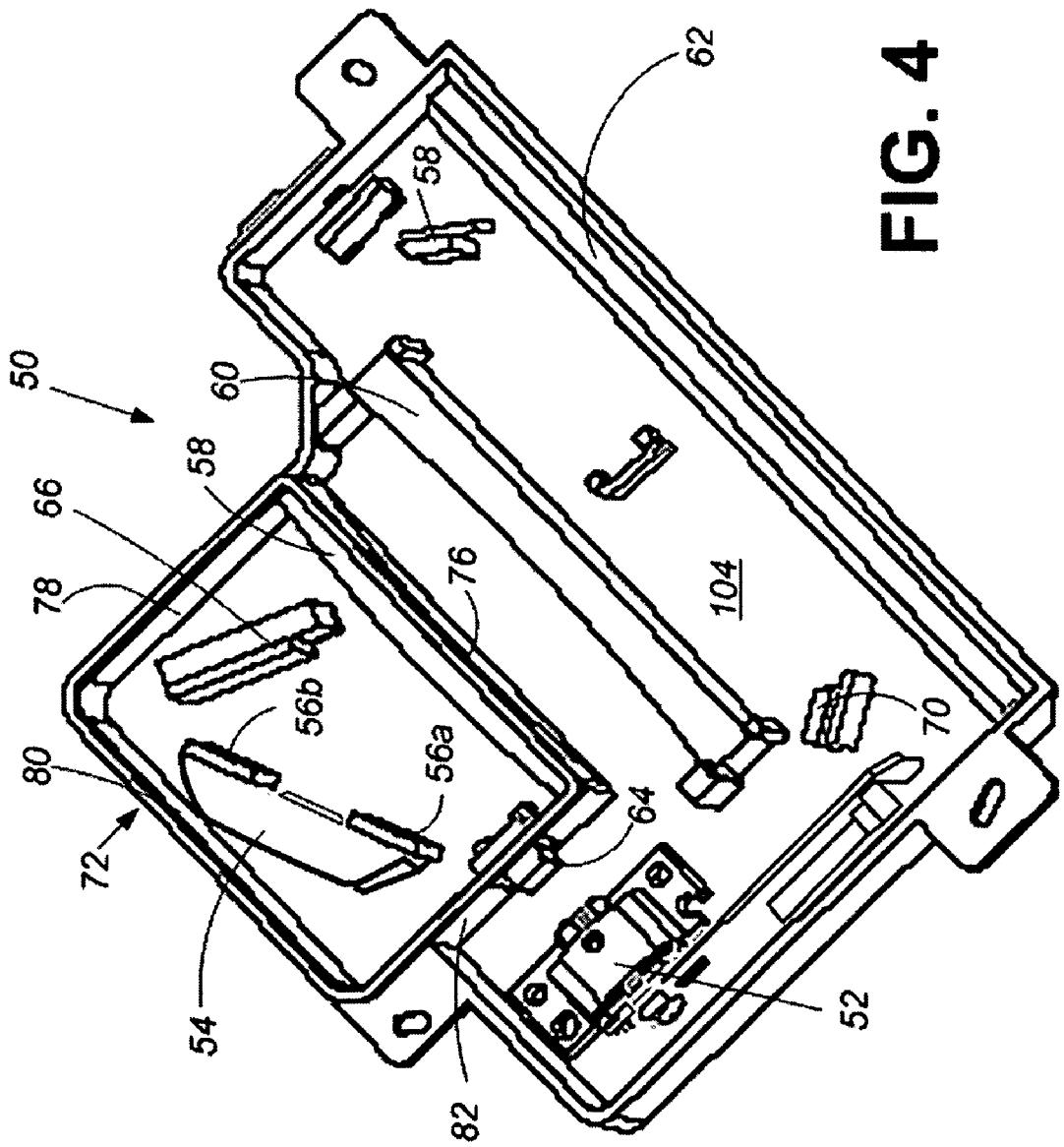
FIG. 4 is a perspective view, not to scale, of a laser scanning unit containing a subunit assembly as described herein.

Several of the main components of the electrophotographic printer 10 are included in a unit assembly referred to as a laser scanning unit (LSU) 50 as shown in FIG. 4. The electrophotographic drum, 18, control system 20 and motor 22 for the drum 18 are typically disposed in the printer 10 separate from the LSU 50. Accordingly, the LSU 50 may be provided in modular form for easy replacement or for retrofitting existing electrophotographic printers.

The components of the LSU 50 include a laser diode assembly 52 including a laser beam source and a collimation lens for providing the laser beam 24, a torsion scanning assembly 54 including mounting brackets 56a and 56b, a first lens 58, a second lens 60, a turning mirror 62, a pre-scan lens 64, stationary mirror 66, and beam scan limit sensors 68 and 70. As described in more detail below, the torsion scanning assembly 54 and stationary mirror 66 are preferably enclosed in a closed compartment 72.

The laser diode assembly 52 provides the collimated laser beam 24 and the beam 24 passes through the pre-scan lens 64 into a closed compartment 72. The pre-scan lens 64 focuses the beam 24 so that the beam 24 is reflected off the stationary mirror 66 onto the oscillating mirror 36 of the torsion scanning assembly 54. As the plate 28 of the torsion scanning assembly 54 oscillates, a reflected beam is provided through the first lens 58 and the second lens 60 and this beam is reflected off of the turning mirror 62 so that it can scan across the drum 18. It will be appreciated that the displacement of the oscillating mirror 36 by the electromagnetic field provides a sinusoidal scan beam before optical linearization. The frequency of oscillations of the oscillating mirror 36 preferably range from about 3000 to about 4000 Hz. Lenses 58 and 60 preferably include an f-theta lens system that converts the sinusoidal motion of the beam from the oscillating mirror 36 into a linear scanning beam that can scan across the surface of the drum 18.

Since the oscillating mirror 36 is displaced by a minor amount to provide a scanning beam having a wide scanning angle, minor fluctuations in the displacement of the oscillating mirror 36 can have significant impact on how accurately the beam 42a, 42b is scanned across the drum 18. Even minor stray air currents in the vicinity of the oscillating mirror 36 can adversely affect the operation of the printer 10.

Figure 5:
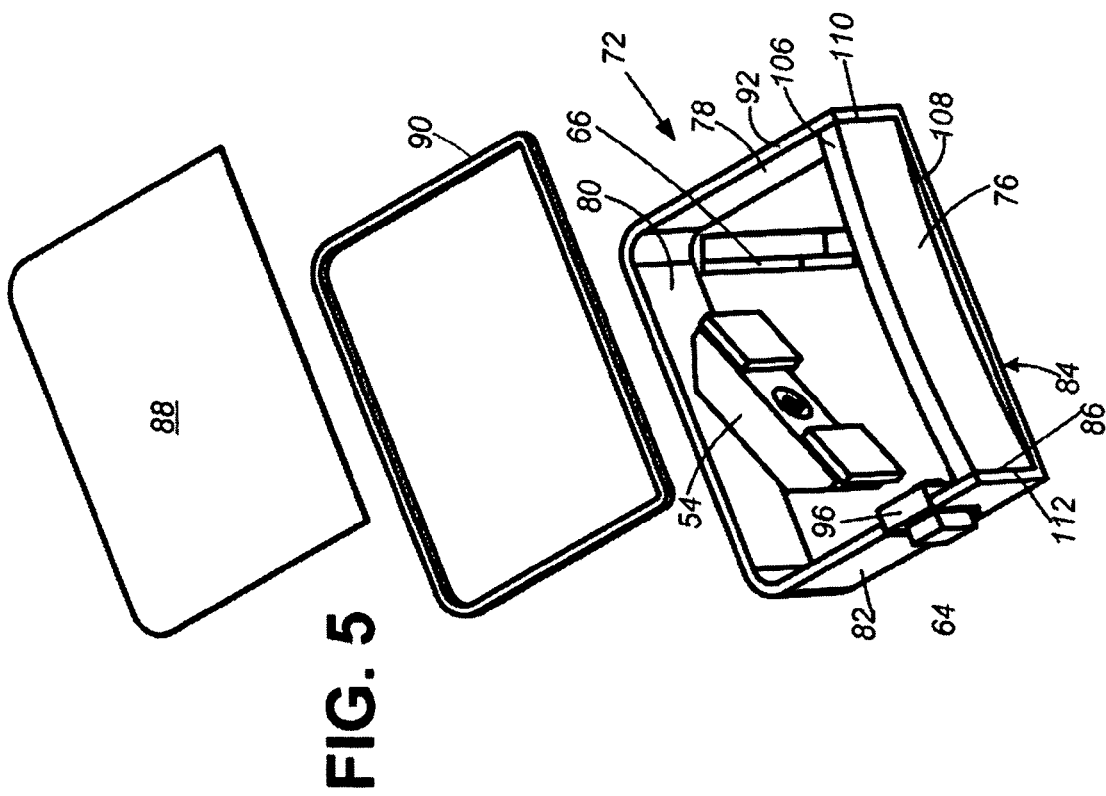
FIG. 5 is a perspective exploded view, not to scale, of a subunit assembly for an electrophotographic printer as described herein.
Figure 6:
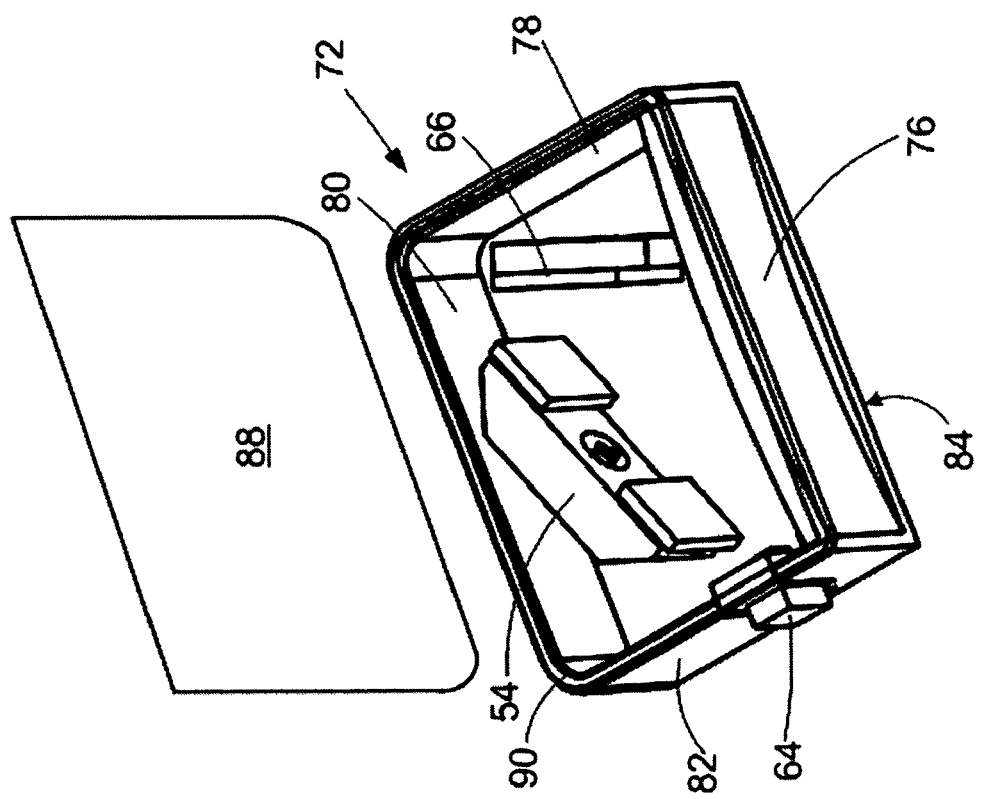
FIG. 6 is a perspective view, not to scale, of a subunit assembly with an attached sealing device for an electrophotographic printer as described herein.
Figure 7:
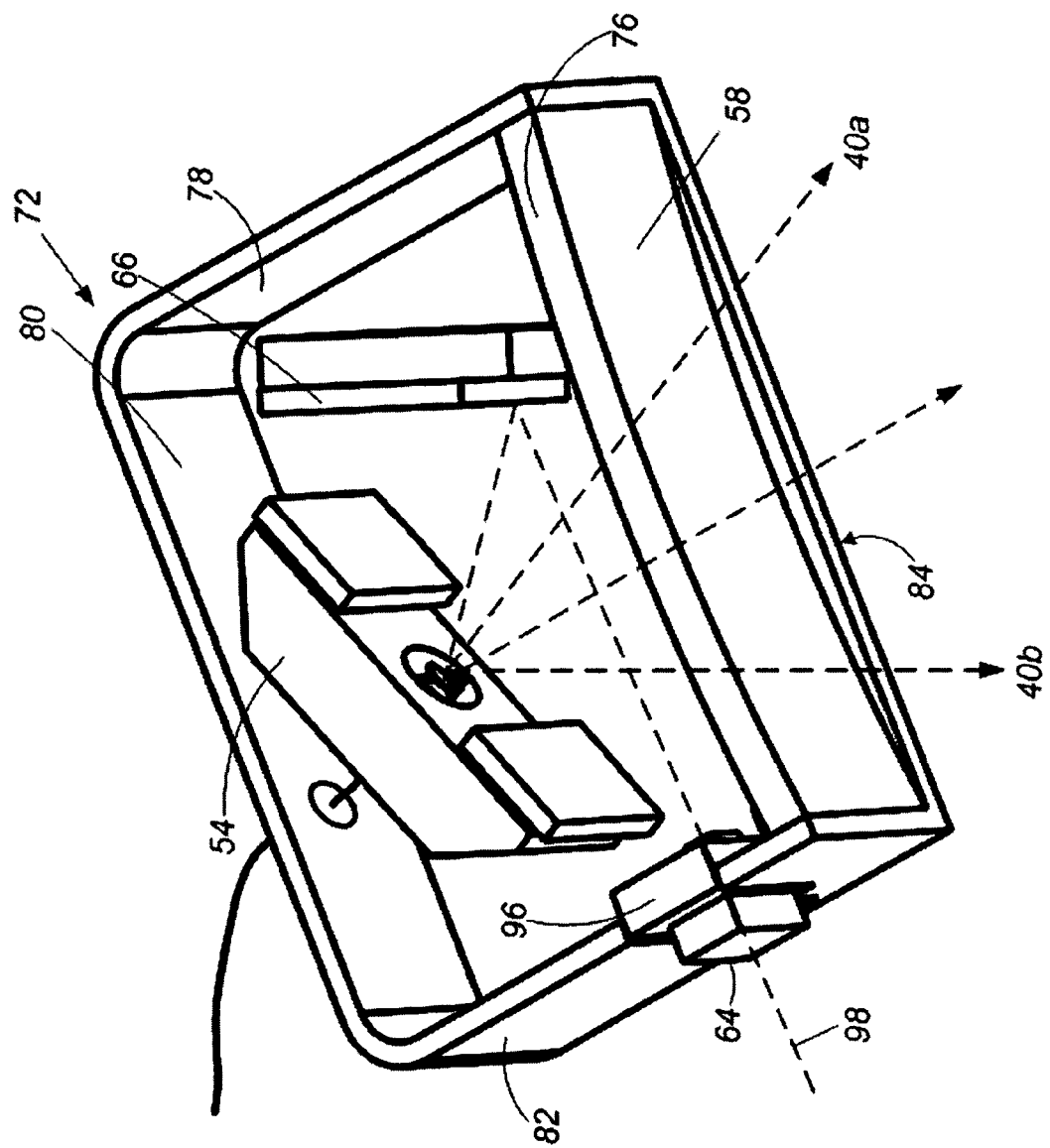
FIG. 7 is a perspective view, not to scale of a subunit assembly for an electrophotographic printer illustrating scan beams.

With reference now to FIGS. 5, 6 and 7 details of an improvement for an electrophotographic printer 10 are illustrated in more detail. With reference to FIG. 5, there is provided, in an exploded view, components of the closed compartment 72. The closed compartment 72 includes side walls 76, 78, 80 and 82, a bottom wall 84 attached to first edges 86 of the side walls 76, 78, 80, and 82, and a cover 88. Disposed within the closed compartment 72 are the torsion scanning assembly 54 and the stationary mirror 66. To further reduce incursion of stray air currents into the closed compartment 72, a resilient sealing device such as a gasket 90 may be disposed between the cover 86 and second edges 92 of the side walls 76, 78, 80 and 82. The gasket 90 may be provided by a solid resilient sheet, or as shown, by a ring of resilient material. The gasket 90 may be made from any material that effectively prevents incursion of air into a cavity 94 defined by the side walls 76, 78, 80, and 82, bottom wall 84, and cover 88. Suitable gasket materials include, but are not limited to, natural and synthetic rubber, polyurethane foam, polystyrene foam, and the like.

The pre-scan lens 64 is held in side wall 82 of the closed compartment 72 by a bracket assembly 96 which is affixed to the side wall 82 by a screw after the lens 64 is adjusted along an optical path to achieve a desired spot focus for a photoconductor image plane. The pre-scan lens 64 and the bracket assembly 96 also serve as part of a seal for the closed compartment 72.

As shown by broken line 98 in FIG. 7, the laser beam 24 (FIG. 1) is focused by the pre-scan lens 64 onto the stationary mirror 66. The beam 24 is reflected off of the stationary mirror 66 and mirrored surface of the torsion scanning assembly 54 such that as the mirror 36 rotates the oscillating beams 40a and 40b are scanned across the first f-theta lens 58. As shown in FIG. 7, the first F-theta lens 58 also serves as the side wall 76 to seal the closed compartment 72. As the oscillating beams 40a and 40b exit the first lens 58, the beams pass through the second f-theta lens 60 (FIG. 4) in the laser scanning unit 50. After exiting the second lens 60, the oscillating beams 40a and 40b are reflected off of the turn mirror 62 so that the beams can be scanned across the photoconductor drum 18 in the printer 10 (FIG. 1). A sealable access port or hole 100 may be provided in one of the side walls, such as side wall 80, or in the bottom wall 84 to provide passage of control wiring to the electromagnetic coils 38 of the torsion scanning device 26 (FIG. 2).

In one embodiment, the closed compartment 72 includes a transparent side wall 76 rather than lens 58, and only the torsion scanning assembly 54 is included in the compartment 72. In this case, the transparent side wall 76 is coated with an anti-reflection optical coating, or mounted at an angle with respect to the torsion scanning assembly 54 so that surface reflections from the transparent side wall 76 are not within an aperture 102 of the torsion scanning assembly 54. In the embodiment illustrated in FIG. 7, the first f-theta lens 58, and the pre-scan lens 64 provide transparent side walls 76 and 82 for laser beam entry and exit from the compartment 72 containing the torsion scanning assembly 54.

In another embodiment, the laser diode assembly 54, torsion scanning assembly 54, and stationary mirror 66 are included in the closed compartment 72. In this embodiment, only one transparent side wall 76 is required. As before, the transparent side wall 76 may be comprise of the first f-theta lens 58 or a transparent window.

As shown in FIG. 4, the closed compartment 72 may be included as an integral part of the laser scanning unit (LSU) 50. In this case, side walls 78 and 80, and a portion of side wall 82 may be existing, and additional side walls or portions of side walls are provided to define the closed compartment 72 as described above. A housing floor 104 of the LSU 50 provides the bottom wall 84 for the closed compartment 72.

Figure 8:
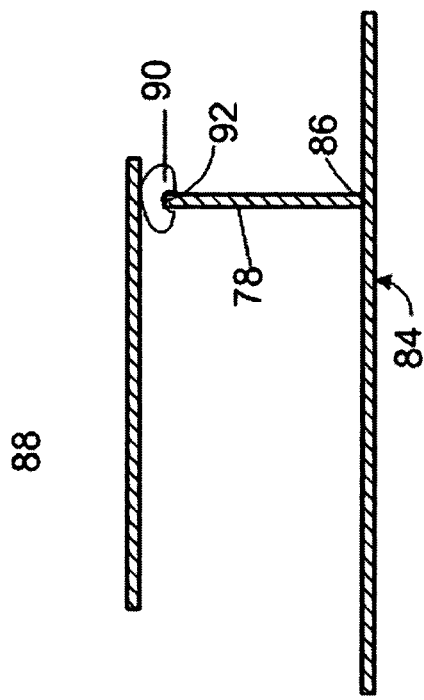
FIG. 8 is a cross-sectional view, not to scale of a portion of a subunit assembly for an electrophotographic printer.

Thus, the external side walls 78 and 80, internal side wall 82 along with the pre-scan lens 64, the lens bracket assembly 96, and the first f-theta lens 58 define the cavity 94 that is closed by cover 88. As shown in FIG. 8, the gasket 90 is applied or attached with an adhesive to the second edge 92 of the side walls 78, 80, and 82, as well as across the top of the first f-theta lens 76 and pre-scan lens bracket assembly 96 to provide a seal between the cover 88 and the side walls 76, 78, 80, and 82. The cover 88, which may be made of metal or plastic, is attached to the closed compartment 72 portion of the LSU 50 assembly with screws or clamps such that the gasket 90 is nominally compressed about 0.75 mm to complete the sealing task. In the alternative, the cover 88 may contain a resilient membrane, at least around the perimeter thereof, to seal the cover 88 to the second edge 92 of the side walls 76, 78, 80, and 82. In another alternative, the cover 88 may be sealed to the closed compartment 72 by use of tape or other plastic material around the perimeter of the cover 88.

The first and second lenses 58 and 60 are preferably made of optical acrylic materials. In order to reduce water absorption into the acrylic material of the lenses 58 and 60 which can potentially affect the optical performance of an acrylic lens, a strip of about 0.18 mm thick aluminum foil is attached with adhesive to the top and bottom edges of both the first and second lenses 58 and 60. Thus the gasket 90 is between the aluminum foil on a top edge 106 of the first lens 58 and the cover 88 and the aluminum foil is between a bottom edge 108 of the first and second lenses 58 and 60 and the LSU housing floor 104. First and second ends 110 and 112 of the first lens 58 may be compression fit between side walls 78 and 82. Additional sealing material or gasket material may be provided between the aluminum foil on the bottom edge 108 of the first lens 58 to seal the lens 58 to the bottom wall 84 or LSU housing floor 104.

Figure 9:
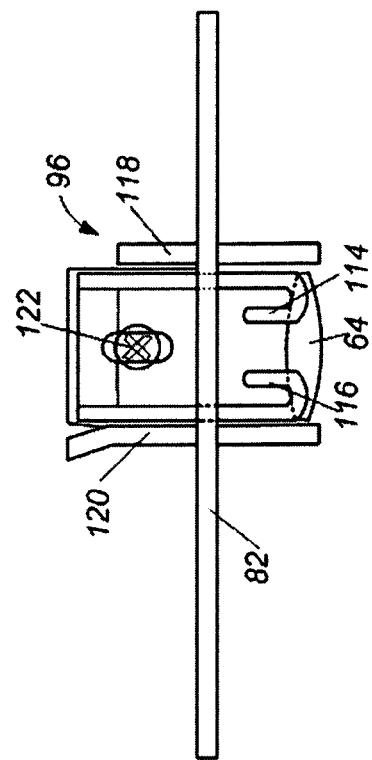
FIG. 9 is a top plan view, not to scale, of a pre-scan lens assembly for an electrophotographic printer.

Details of the pre-scan lens 64 and bracket assembly 96 are illustrated in FIG. 9, which is a top plan view of the lens and assembly. The pre-scan lens 64 is held against datum surfaces in the bracket assembly 96 by spring arms 114 and 116 which are molded as part of the bracket 96. The entire bracket assembly 96 slides between bracket walls 118 and 120 which are wings extended out of side wall 82. The pre-scan lens 64 captured in the bracket 96 is slid toward or away from the laser diode assembly 52 as needed during the assembly operation to insure that the proper spot sizes are focused on the photoconductor image plane. Once the pre-scan lens 64 is placed in the appropriate location a fastening device, such as screw 122 is used to capture the bracket assembly 96 and secure the assembly 96 in place. The bracket assembly 96 and walls 118 and 120 are designed for a slip fit. For example, in a preferred embodiment, the bracket assembly 96 will touch "line-to-line" with the walls 118 and 120, or a slight clearance of about 0.1 mm may exist between the walls 118 and 120 and the bracket assembly 96. If a tighter seal is required, a foam seal, or, alternatively an adhesive bead, can be placed on the face of the bracket assembly 96 adjacent the walls 118 and 120 to close any slight gap that may exist. The bracket assembly 96 slides in a recessed area between the walls 118 and 120 and the bottom wall 84 which provides a guidance track to maintain the pre-scan lens alignment with the laser beam optical path and also provides a labyrinth seal between the bottom of the pre-scan lens bracket assembly 96 and the bottom wall 84.

The use of the closed compartment 72 subassembly having side walls 76, 78, 80 and 82 including a first lens 58 and a pre-scan leans 64, a cover 88, a sealing device such as gasket 90 to provide a sealed cavity containing the torsion scanning assembly 54 provides a relatively cost effective means for preventing stray air currents from affecting the torsion scanning device 26. By providing a closed compartment 72 as a subassembly unit for the laser scanning unit 50, the entire perimeter of the laser scanning unit 50 need not be sealed to provide the desired effect.

While the closed compartment 72 is sealed from effects of air currents, there is no need to provide a subatmospheric pressure in the closed compartment 72. In fact, it is preferred that the closed compartment contain air at ambient pressure equivalent to the ambient pressure outside of the closed compartment 72.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. In an electrophotographic printer containing a torsion oscillator type laser scanning device which oscillates during use, the improvement comprising an enclosed housing containing a torsion oscillator comprising an oscillating mirror, the enclosed housing having side walls, wherein one of the side walls contains a pre-scanning lens and a second side wall contains a second lens, a bottom wall adjacent first ends of the side walls, and a cover adjacent to opposing second ends of the side walls, each positioned relative to one another so as to yield the enclosed housing, wherein the housing is enclosed to sufficiently prevent air currents from affecting oscillations of the torsion oscillator during an electrophotographic scanning process.

2. The improvement of claim 1 further comprising a sealing device disposed between the cover and the second ends of the side walls.

3. The improvement of claim 1 wherein the bottom wall comprises a portion of a laser scanning unit for the electrophotographic printer.

4. The improvement of claim 1 wherein the housing comprises a portion of a laser scanning unit for the electrophotographic printer.

5. The improvement of claim 4 wherein the laser scanning unit includes a laser beam source and a turning mirror.

6. A method for improving the operation of an electrophotographic printer comprising the steps of:
providing an electrophotographic printer containing a laser scanning unit; and enclosing a torsion oscillator comprising an oscillating mirror for the laser scanning unit in a closed compartment, the closed compartment including side walls having first and second side wall edges, wherein one of the side walls contains a pre-scanning lens and a second side wall contains a second lens, a bottom wall attached on the first side wall edges, and a cover attached adjacent to the second side wall edges, wherein the closed compartment is sufficient to reduce stray air currents from adjacent the torsion oscillator.

7. The method of claim 6 further comprising disposing a sealing device between the cover and the second side wall edges.

8. The method of claim 7 wherein the bottom wall comprises a portion of the laser scanning unit.

9. A subunit for an electrophotographic printer comprising a closed compartment having a bottom wall and side walls including a torsion oscillator device comprising an oscillating mirror, said oscillator device being attached to the bottom wall between the sidewalls having first and second side wall edges, wherein one of the side walls contains a pre-scanning lens and a second side wall contains a second lens, and a cover attached adjacent to the second side wall edges, wherein the torsion oscillator device in the closed compartment is effectively isolated from stray air currents that can affect the operation of the electrophotographic printer.

10. The subunit of claim 9 further comprising a sealing device disposed between the cover and the second side wall edges.

11. A laser scanning unit for an electrophotographic printer comprising the subunit of claim 9.

12. An electrophotographic printer comprising the laser scanning unit of claim 11.

13. An electrophotographic printer comprising the subunit of claim 9.

* * * * *